United States Patent

Wu

[11] 3,901,718
[45] Aug. 26, 1975

[54] ABSORPTIVE GLASS

[75] Inventor: Jimmy C. C. Wu, Southbridge, Mass.

[73] Assignee: American Optical Corporation, Southbridge, Mass.

[22] Filed: Jan. 3, 1969

[21] Appl. No.: 790,512

[52] U.S. Cl. ............... 106/47 R; 106/50; 350/96 B
[51] Int. Cl.$^2$ .......................................... C03C 3/30
[58] Field of Search ...................... 106/47, 47 R, 50

[56] References Cited
UNITED STATES PATENTS

| | | | |
|---|---|---|---|
| 2,996,390 | 8/1961 | Weissenberg et al. | 106/47 O |
| 3,220,861 | 11/1965 | Parry et al. | 106/47 |
| 3,278,317 | 11/1966 | Blair et al. | 106/47 |
| 3,328,181 | 6/1967 | Weidel | 106/47 O |
| 3,499,775 | 3/1970 | Albinak et al. | 106/47 |

*Primary Examiner*—Leland A. Sebastian
*Attorney, Agent, or Firm*—William C. Nealon

[57] ABSTRACT

Glass having an extremely high absorption coefficient for incident light in fiber optical image transfer devices and working compatibility with conventional light-conducting glasses used in the manufacture of such devices.

8 Claims, No Drawings

ABSORPTIVE GLASS

BACKGROUND OF THE INVENTION

1. Field of the Invention

Glass compositions relating more particularly to improved light absorptive glass materials for use in fiber optical image-transfer devices.

2. Description of Prior Art

Fiber optical image-transfer devices such as are shown in application Ser. No. 238,372, now U.S. Pat. No. 3,387,959, entitled Fiber Optical Image Transfer Devices and MEthod of Making the Same, filed Nov. 19, 1962 and assigned to the same assignee as the present invention, have light-conducting optical fibers secured in bundled side-by-side relation with each other. Each optical fiber comprises a core filament, frequently formed of a lanthanum borate glass material surrounded by a cladding of a different glass material. The core filament material is of relatively higher refractive index than the fiber cladding material. Interspersed within this bundle between the light-conducting optical fibers are light-absorbing fibers each having a core filament of absorptive glass material surrounded by a cladding of a different light-transmitting glass material. Usually the same material is used for cladding both the light-conducting and light-absorbing fibers so that the claddings of both types of fibers can be easily fused together to form a vacuum-tight bundle of fibers. It will be understood that the core filaments and fiber cladding materials must be of compatible fusing temperature, drawing temperature, viscosity, coefficient of thermal expansion and the like so that the filament cores can be clad by conventional techniques and so that the fibers can be readily fused together. Particularly where the light-conducting fibers are to be drawn together with light-absorbing fibers to form multifiber units, it is desirable that the cores of both types of fibers be of compatible fusing temperature, drawing temperature etc. It will also be understood that, in order to perform their function as described in said copending application, the light-absorbing core materials are preferably adapted for extremely high absorption of incident light.

SUMMARY OF THE INVENTION

The absorptive glass material provided by this invention incorporates mixtures of phosphate pentoxide ($P_2O_5$) and either molybdenum trioxide ($MoO_3$) or vanadium pentoxide ($V_2O_5$) or both as its principal glass forming ingredients. Phosphate pentoxide is preferably used within the range from approximately 14 to 35 weight percent of the glass composition, molybdenum trioxide is preferably used within the range of approximately 0 to 45 weight percent of the composition and the vanadium pentoxide is preferably used within the range from approximately 0 to 35 weight percent of the composition. When both of the latter two ingredients are used at the same time, the range for the $MoO_3$ will be between approximately 25 to 45 weight percent of the composition and the range for the $V_2O_5$ will be between approximately 20 and 29 weight percent of the composition. Such glass materials may also incorporate calcium oxide (CaO) within the range of approximately 0 to 5 weight percent. The glass compositions of this invention may further embody ferrous oxide ($Fe_3O_4$), this ingredient preferably being incorporated within the range from approximately 5 to 15 weight percent. In addition, these glass materials can also incorporate other ingredients such as tungsten trioxide ($WO_3$) within the range from about 0 to 30 weight percent, barium oxide (BaO) within the range from approximately 0 to 15 weight percent. Additionally other ingredients which may be included are cobalt oxide ($Co_3O_4$) in the weight percent range of approximately 0 to 8%, manganese dioxide ($MnO_2$) in the weight percent range of approximately 0 to 10%, nickel oxide (NiO) in the weight percent range of approximately 0 to 5%, cupric oxide (CuO) in the weight percent range of approximately 0 to 5%, and chromium oxide ($Cr_2O_3$) in the weight percent range of approximately 0 to 3%.

In accordance with this invention, the highly absorptive glass materials incorporate the manganese dioxide ($MnO_2$) within the above range for improving the optical density properties of the glass. In addition, these glass materials may incorporate one or more of the above-mentioned ingredients $Co_3O_4$, NiO, CuO and $Cr_2O_3$ as additional colorants for further increasing the optical density of the glass materials.

DESCRIPTION OF THE PREFERRED EMBODIMENTS

The various ingredients of the glass materials of this invention can be varied within the limits as described so that the calculated composition of the glass materials can be set forth as follows:

|  | Percent by Weight |
| --- | --- |
| $P_2O_5$ | 14 to 44 |
| $V_2O_5$ | 0 to 35 |
| $MoO_3$ | 25 to 45 |
| $WO_3$ | 0 to 30 |
| CaO | 0 to 7 |
| BaO | 0 to 15 |
| $Fe_3O_4$ | 5 to 15 |
| $Co_3O_4$ | 0 to 8 |
| $MnO_2$ | 0 to 10 |
| NiO | 0 to 5 |
| CuO | 0 to 5 |
| $Cr_2O_3$ | 0 to 3 | said glasses having an optical density, that is of total integrated transmission for the optical region of less than 0.5% in a sample sheet of glass of approximately 80 microns thickness.

It is pointed out that a particular feature of this invention is that the principal glass forming ingredients, for example, $P_2O_5$, $V_2O_5$ and $MoO_3$, are, in combination, both colorants and network formers which produce the glass. However, additional colorants may be added as already indicated above.

Specific examples of compositions which have given good glasses having at least the light absorption properties desired are as follows:

Composition A

|  | Percent by Weight |
| --- | --- |
| $P_2O_5$ | 14.86 |
| $V_2O_5$ | 28.45 |
| $MoO_3$ | 37.40 |
| CaO | 1.16 |
| BaO | 8.00 |
| $Fe_3O_4$ | 6.13 |
| $Co_3O_4$ | 4.00 |

-Continued

Composition B

| | Percent by Weight |
|---|---|
| $P_2O_5$ | 14.86 |
| $V_2O_5$ | 28.45 |
| $MoO_3$ | 37.40 |
| CaO | 1.16 |
| BaO | 10.00 |
| $Fe_3O_4$ | 6.13 |
| $Co_3O_4$ | 2.00 |

Composition C

| | Percent by Weight |
|---|---|
| $P_2O_5$ | 26.00 |
| $MoO_3$ | 28.32 |
| $WO_3$ | 27.42 |
| CaO | 0.81 |
| BaO | 8.37 |
| $Fe_3O_4$ | 9.08 |

Composition D

| | Percent by Weight |
|---|---|
| $P_2O_5$ | 26.52 |
| $V_2O_5$ | 20.48 |
| $WO_3$ | 15.50 |
| BaO | 14.50 |
| $Fe_3O_4$ | 7.30 |
| $Co_3O_4$ | 3.20 |
| $MnO_2$ | 8.50 |
| NiO | 1.30 |
| CuO | 2.00 |
| $Cr_2O_3$ | 0.70 |

Composition E

| | Percent by Weight |
|---|---|
| $P_2O_5$ | 14.00 |
| $V_2O_5$ | 25.45 |
| $MoO_3$ | 30.40 |
| $WO_3$ | 2.00 |
| CaO | 2.16 |
| BaO | 12.00 |
| $Fe_3O_4$ | 6.13 |
| $Co_3O_4$ | 2.00 |
| $MnO_2$ | 3.86 |
| NiO | 0.50 |
| CuO | 1.50 |

Preferred raw batch compositions for achieving the specific glass just mentioned are as follows:

Raw Batch Compositions In Grams

Example A

| | Parts by Weight |
|---|---|
| $NH_4H_2PO_4$ | 120.35 |
| $V_5O_2$ | 142.25 |
| $MoO_3$ | 187.00 |
| $CaCO_3$ | 10.35 |
| $Ba(NO_3)_2$ | 68.00 |
| $Fe_3O_4$ | 30.65 |
| $Co_3O_4$ | 20.00 |

Example B

| | Parts by Weight |
|---|---|
| $NH_4H_2PO_4$ | 120.35 |
| $V_5O_2$ | 142.25 |
| $MoO_3$ | 187.00 |
| $CaCO_3$ | 10.35 |
| $Ba(NO_3)_2$ | 102.00 |
| $Fe_3O_4$ | 30.65 |

Example C

| | Parts by Weight |
|---|---|
| $NH_4H_2PO_4$ | 210.60 |
| $MoO_3$ | 141.60 |
| $WO_3$ | 137.10 |
| $CaCO_3$ | 7.25 |
| $Ba(NO_3)_2$ | 71.15 |

-Continued

| | |
|---|---|
| $Fe_3O_4$ | 45.40 |

Example D

| | Parts by Weight |
|---|---|
| $NH_4H_2PO_4$ | 214.80 |
| $V_5O_2$ | 102.40 |
| $WO_3$ | 77.50 |
| $Ba(NO_3)_2$ | 123.25 |
| $Fe_3O_4$ | 36.50 |
| $Co_3O_4$ | 16.00 |
| $MnO_2$ | 42.50 |
| NiO | 6.50 |
| CuO | 10.00 |
| $Cr_2O_3$ | 3.50 |

Example E

| | Parts by Weight |
|---|---|
| $NH_4H_2PO_4$ | 113.40 |
| $V_5O_2$ | 127.25 |
| $MoO_3$ | 152.00 |
| $WO_3$ | 10.00 |
| $CaCO_3$ | 19.30 |
| $Ba(NO_3)_2$ | 102.00 |
| $Fe_3O_4$ | 30.65 |
| $Co_3O_4$ | 10.00 |
| $MnO_2$ | 19.30 |
| NiO | 2.50 |
| CuO | 7.50 |

According to this invention, the described raw batch ingredients are weighed out and are finely ground and mixed in conventional manner and are preferably placed and melted in a platinum crucible. During the melting of the glass batch it is preferably stirred with a conventional platinum stirrer for homogenization and fining operations under controlled heating conditions. The homogenized and fined glass is then cast into molds of metal, graphite or ceramic refractory materials of any shape desired.

The absorptive glasses of this invention are durable and stable and are chemically and thermally compatible with conventional glasses employed in optical fibers. The glasses are of good quality and are substantially free of bubbles, seeds and other inclusions. Generally, the glasses do not tend to bloom (form surface films) or to devitrify as do other extremely absorptive glasses. In particular, the improved absorptive glasses have fusing temperatures, drawing temperatures, viscosities and coefficients of thermal expansion compatible with the lanthanum borate glasses conventionally employed as core materials in light-conducting optical fibers. The absorptive glasses can be readily drawn, clad and fused together with conventional optical fiber glass materials and, when embodied in fiber optical image transfer devices such as already noted can be conveniently ground and polished by conventional techniques. These novel glass materials are also chemically compatible with phosphors and the like conventionally employed with fiber optical image-transfer devices.

It will be understood that the examples of glass materials described herein have been described by way of illustration and that this invention includes all modifications and equivalents of said glasses which fall within the scope of the appended claims.

I claim:

1. An absorptive glass material of a composition consisting essentially of the following ingredients:

| | Percent by Weight |
|---|---|
| $P_2O_5$ | 14 to 44 |
| $V_2O_5$ | 0 to 35 |
| $MoO_3$ | 0 to 45 |
| $WO_3$ | 0 to 30 |
| CaO | 0 to 7 |
| BaO | 0 to 15 |
| $Fe_3O_4$ | 5 to 15 |
| $Co_3O_4$ | 0 to 8 |
| $MnO_2$ | 0 to 10 |
| NiO | 0 to 5 |
| CuO | 0 to 5 |
| $Cr_2O_3$ | 0 to 3 | said glass having a total integrated light transmission for the optical region of the spectrum of less than 1.0% in a thickness of 80 microns.

2. An absorptive glass material according to claim 1 and having the following ingredients:

| | Percent by Weight |
|---|---|
| $P_2O_5$ | 14.86 |
| $V_2O_5$ | 28.45 |
| $MoO_3$ | 37.40 |
| CaO | 1.16 |
| BaO | 8.00 |
| $Fe_3O_4$ | 6.13 |
| $Co_3O_4$ | 4.00. |

3. An absorptive glass material according to claim 1 and having the following ingredients:

| | Percent by Weight |
|---|---|
| $P_2O_5$ | 14.86 |
| $V_2O_5$ | 28.45 |
| $MoO_3$ | 37.40 |
| CaO | 1.16 |
| BaO | 10.00 |
| $Fe_3O_4$ | 6.13 |
| $Co_3O_4$ | 2.00. |

4. An absorptive glass material according to claim 1 and having the following ingredients:

| | Percent by Weight |
|---|---|
| $P_2O_5$ | 26.00 |
| $MoO_3$ | 28.32 |
| $WO_3$ | 27.42 |
| CaO | 0.81 |
| BaO | 8.37 |
| $Fe_3O_4$ | 9.08. |

5. An absorptive glass material according to claim 1 and having the following ingredients:

| | Percent by Weight |
|---|---|
| $P_2O_5$ | 26.52 |
| $V_2O_5$ | 20.48 |
| $WO_3$ | 15.50 |
| BaO | 14.50 |
| $Fe_3O_4$ | 7.30 |
| $Co_3O_4$ | 3.20 |
| $MnO_2$ | 8.50 |
| NiO | 1.30 |
| CuO | 2.00 |
| $Cr_2O_3$ | 0.70. |

6. An absorptive glass material according to claim 1 and having the following ingredients:

| | Percent by Weight |
|---|---|
| $P_2O_5$ | 14.00 |
| $V_2O_5$ | 25.45 |
| $MoO_3$ | 30.40 |
| $WO_3$ | 2.00 |
| CaO | 2.16 |
| BaO | 12.00 |
| $Fe_3O_4$ | 6.13 |
| $Co_3O_4$ | 2.00 |
| $MnO_2$ | 3.86 |
| NiO | 0.50 |
| CuO | 1.50. |

7. An absorptive glass material according to claim 1 and having the following ingredients:

| | Percent by Weight |
|---|---|
| $V_2O_5$ | 18.8 |
| $MoO_3$ | 31.4 |
| $P_2O_5$ | 43.6 |
| CaO | 6.2. |

8. An absorptive glass material according to claim 1 and having the following ingredients:

| | Percent by Weight |
|---|---|
| $MoO_3$ | 32.55 |
| $P_2O_5$ | 30.10 |
| CaO | 2.38 |
| $Fe_3O_4$ | 6.47 |
| $WO_3$ | 19.50 |
| BaO | 9.00. |

* * * * *